US006301013B1

(12) United States Patent
Momose et al.

(10) Patent No.: US 6,301,013 B1
(45) Date of Patent: Oct. 9, 2001

(54) PRINTING CONTROL APPARATUS, PRINTING CONTROL METHOD, AND COMPUTER PROGRAM PRODUCT FOR REALIZING THE METHOD

(75) Inventors: Hiroaki Momose; Kazunobu Nimura, both of Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/144,492

(22) Filed: Aug. 31, 1998

(30) Foreign Application Priority Data

Sep. 9, 1997 (JP) .................................... 9-244167
Aug. 4, 1998 (JP) .................................. 10-233624

(51) Int. Cl.[7] ....................................... G06F 15/00
(52) U.S. Cl. ..................... 358/1.15; 358/1.2; 358/1.13; 358/1.14; 358/296
(58) Field of Search ....................... 358/1.2, 1.5, 1.12, 358/1.13, 1.14, 1.15, 1.18, 296

(56) References Cited

U.S. PATENT DOCUMENTS 5,495,561 * 2/1996 Holt ...................................... 358/1.15
5,615,015 * 3/1997 Krist et al. ........................... 358/1.15
5,689,626 * 11/1997 Conley ................................. 358/1.18
5,828,461 * 10/1998 Kubo et al. ............................ 358/296

FOREIGN PATENT DOCUMENTS 60-178530  9/1985  (JP).
8-127161  5/1996  (JP).
8-202519  8/1996  (JP).

* cited by examiner

Primary Examiner—Edward Coles
Assistant Examiner—Mark Wallerson
(74) Attorney, Agent, or Firm—Oblon, Spivak, McClelland, Maier & Neustadt, P.C.

(57) ABSTRACT

A printing control apparatus that facilitates settings, such as magnification-reduction and a layout of plural pages on one printing plane, and thereby improves the operatability. The operator sets in advance print attribute information, such as an orientation, a printable area, and magnification-reduction, mapped to plural pieces of logic sheet information with a data input device 5. The plural pieces of logic sheet information with the print attribute information mapped thereto are accordingly registered in a pull-down menu 47. The operator selects one piece of logic sheet information out of the pull-down menu 47, so as to set the print attribute information corresponding to the selected piece of logic sheet information. In the printing control apparatus, bit map data based on print data are edited according to these various pieces of information.

15 Claims, 12 Drawing Sheets

Fig. 12

| User Attributes Registration | |
|---|---|
| Sheet Size : | |
| A3 297×420mm | |
| A4 210×297mm | |
| B3 182×257mm | |
| . . . | |
| . . . | |
| | |

TBL PRINT ATTRIBUTE INFORMATION TABLE

| ID | Logic Sheet Info. | Printing Sheet Info. | Magnification-Reduction | Orientation | - - - | Watermark | - - - |
|----|-------------------|----------------------|-------------------------|-------------|-------|-----------|-------|
| 01 | A3 | A3 | 100% | Portrait | - - - | Watermark | - - - |
| 02 | A4 | A4 | 100% | Portrait | - - - | None | - - - |
| 03 | B5 | B5 | 100% | Portrait | - - - | None | - - - |
| 04 | A2 | A4 | 48% | Portrait | - - - | None | - - - |
| 05 | A4 | Postcard | 44% | 180 deg. | - - - | Watermark | - - - |

Fig. 15

| Sheet Size | A4 (Reduction ⇒ Postcard 180 deg. Watermark) ▼ |

| A3  297 × 420mm |
| A4  210 × 420mm |
| B5  182 × 257mm |
| A2     (Reduction ⇒ A4) |
| A4     (Reduction ⇒ Postcard 180 deg. Watermark) |
| A4     (Gloss Paper) |
| User Attributes Settings |

~200

PRINTING CONTROL APPARATUS, PRINTING CONTROL METHOD, AND COMPUTER PROGRAM PRODUCT FOR REALIZING THE METHOD

BACKGROUND OF THE INVENTION

1. Field of the Invention

The present invention relates to a printing control apparatus and a printing control method that control printing by a printing device, which is connected, for example, with a personal computer. The present invention also pertains to a computer program product that gives the function of the printing control to the personal computer.

2. Description of the Related Art

When a printer or printing device is connected to a personal computer and print data prepared by the personal computer are printed by the printer, it is generally required to incorporate a device driver for the printer (hereinafter referred to as the printer driver) into the personal computer. The printer driver is a computer program that sets various pieces of information regarding the printer, such as functions of the printer, an interface, font data, and control codes, in the computer to control the printer, and is provided for each model of the printer used for printing.

The functions of the printer set by the printer driver include a function of expanding the area on a printing sheet on which an image is printed and a function of simultaneously printing a plurality of pages on one printing sheet. A known printing control apparatus having the latter function is disclosed, for example, in JAPANESE PATENT LAID-OPEN GAZETTE No. 60-178530. In this printing control apparatus, switches disposed on a switch panel are operated to specify the number of pages to be printed on one printing sheet and the output position of data from the left end of the printing sheet. The print data are edited according to these specified conditions and output to the printer. This realizes printing with respect to the plurality of pages to be printed simultaneously on one printing sheet.

In the conventional printing technique, it is required to specify the number of pages to be printed on one printing sheet and the output position of data from the left end of the printing sheet, in addition to the size of the printing sheet. This makes the operation rather complicated and results in the poor convenience of the user.

SUMMARY OF THE INVENTION

The object of the present invention is thus to facilitate an operation for setting print attribute information, which represents attributes relating to printing, such as magnification-reduction and layout of plural pages on one printing plane, so as to enhance the convenience of the user.

At least part of the above and the other related objects is realized by a first printing control apparatus that sets various pieces of information used for printing by a predetermined printing device and causes the printing device to record print data according to the various pieces of information. The first printing control apparatus includes: a logic sheet information storage unit that stores plural pieces of logic sheet information that represent possible sheet sizes of the print data; an attribute information setting unit that sets print attribute information, which represents an attribute with respect to printing of the print data, mapped to at least part of the plural pieces of logic sheet information stored in the logic sheet information storage unit, based on input data from an input device; a selection unit that selects one piece of logic sheet information among the plural pieces of logic sheet information including the at least part of logic sheet information for which the print attribute information is set; and a printing information setting unit that sets the selected one piece of logic sheet information with the print attribute information, when the print attribute information has been set corresponding to the selected piece of logic sheet information, as the various pieces of information for printing.

In the first printing control apparatus of this structure, the operator previously sets the print attribute information mapped to the logic sheet information with the input device. When one piece of logic sheet information is selected by the selection unit, both the selected piece of logic sheet information and the corresponding print attribute information are set as the various pieces of information for printing.

The first printing control apparatus of the present invention facilitates the process of setting the print attribute information, which represents attributes relating to printing, for example, magnification-reduction and a layout of a plurality of pages in one printing plane, corresponding to the logic sheet information, thereby enhancing the convenience of the user.

In accordance with one preferable application, the selection unit of the first printing control apparatus includes: a display control unit that causes the plural pieces of logic sheet information to be displayed with index information, which is an index of the print attribute information set by the attribute information setting unit, on a display device; and a selecting unit that selects one piece of logic sheet information among the plural pieces of logic sheet information displayed by the display control unit, based on input data from the input device.

This structure enables the operator to operate the input device and select a desired piece of logic sheet information with the print attribute information, while observing the logic sheet information and the index information displayed on the display device. This accordingly improves the operatability of the printing control apparatus.

In the first printing control apparatus, the index information may be sheet type information representing a type of a printing sheet set in the printing device. Some of the attributes with respect to printing of the print data are unequivocally specified according to the type of the printing sheet. Displaying the type of the printing sheet as the index information on the display device thus enables the operator to recognize the print attribute information specified by the type of the printing sheet.

In the first printing control apparatus of the above structure, it is preferable that the display control unit causes a specific window to be displayed on the display device. The specific window includes the plural pieces of logic sheet information arrayed in rows and the index information with respect to the print attribute information added to specific rows of the logic sheet information, for which the print attribute information has been set by the attribute information setting unit.

This structure enables the operator to easily select a desired piece of logic sheet information with the index information added to the same row in the displayed window.

In accordance with another preferable application, the first printing control apparatus is further provided with a data generation unit that generates the print data for the printing device; and a notification unit that informs the data generation unit of the contents set by the attribute information setting unit.

In this structure, the data generation unit generates the print data based on the notified settings and outputs a printing instruction.

One typical example of the print attribute information is a magnification-reduction ratio that is calculated from a size of a printing sheet actually set in the printing device and the logic sheet information. Another example is a number of pages to be laid out in one printing plane of a printing sheet set in the printing device and a sequence of layout arrangement. Still another example is an orientation of a printing image by the printing device, which includes a rotation by 180 degrees. Another example is a watermark printed on a printing sheet set in the printing device as well as a specification of the watermark, that is, a printing position, a size, a color, and a density of the watermark. The print attribute information mapped to the logic sheet information can be displayed with the corresponding logic sheet information as a print form image. The watermark here does not mean a marking in paper, such as banknotes, resulting from differences in thickness, but denotes a specific mark like Confidential or Urgent, which the operator desires to print separately from the print data on a printing sheet, for example.

The present invention is also directed to a second printing control apparatus that sets various pieces of information used for printing by a predetermined printing device and causes the printing device to record print data according to the various pieces of information. The second printing control apparatus includes: a printing sheet information storage unit that stores plural pieces of printing sheet information that represent sizes of available printing sheets set in the printing device; an attribute information setting unit that sets print attribute information, which represents an attribute with respect to printing of the print data, mapped to at least part of the plural pieces of printing sheet information stored in the printing sheet information storage unit, based on input data from an input device; a selection unit that selects one piece of printing sheet information among the plural pieces of printing sheet information including the at least part of printing sheet information for which the print attribute information is set; and a printing information setting unit that sets the selected one piece of printing sheet information with the print attribute information, when the print attribute information has been set corresponding to the selected piece of printing sheet information, as the various pieces of information for printing.

In the second printing control apparatus of this structure, the operator previously sets the print attribute information mapped to the printing sheet information with the input device. When one piece of printing sheet information is selected by the selection unit, both the selected piece of printing sheet information and the corresponding print attribute information are set as the various pieces of information for printing.

The second printing control apparatus of the present invention facilitates the process of setting the print attribute information, which represents attributes relating to printing, for example, a layout of a plurality of pages in one printing plane, corresponding to the printing sheet information, thereby enhancing the convenience of the user.

In accordance with one preferable application, the selection unit of the second printing control apparatus includes: a display control unit that causes the plural pieces of printing sheet information to be displayed with index information, which is an index of the print attribute information set by the attribute information setting unit, on a display device: and a selecting unit that selects one piece of printing sheet information among the plural pieces of printing sheet information displayed by the display control unit, based on input data from the input device.

The present invention is further directed to a third printing control apparatus that sets various pieces of information used for printing by a predetermined printing device and causes the printing device to record print data according to the various pieces of information. The third printing control apparatus includes: a logic sheet information storage unit that stores plural pieces of logic sheet information that represent possible sheet sizes of the print data; an attribute information storage unit that stores print attribute information, which represents an attribute with respect to printing of the print data and does not change the sheet size, in a specific relation mapped to at least part of the plural pieces of logic sheet information stored in the logic sheet information storage unit; a display control unit that causes the plural pieces of logic sheet information to be displayed with the print attribute information of the specific relation on a display device; a selection unit that selects one piece of logic sheet information among the plural pieces of logic sheet information displayed by the display control unit, based on input data from an input device; and a printing information setting unit that sets the selected one piece of logic sheet information with the print attribute information, when the print attribute information has been set corresponding to the selected piece of logic sheet information, as the various pieces of information for printing.

In the third printing control apparatus of this structure, the operator previously sets the print attribute information, which does not change the sheet size, corresponding to the logic sheet information with the input device. When one piece of logic sheet information is selected by the selection unit, both the selected piece of logic sheet information and the corresponding print attribute information are set as the various pieces of information for printing.

Like the first printing control apparatus discussed above, the third printing control apparatus of the present invention facilitates the process of setting the print attribute information, which represents attributes relating to printing, for example, magnification-reduction and a layout of a plurality of pages in one printing plane, corresponding to the logic sheet information, thereby enhancing the convenience of the user.

In accordance with one preferable application, the selection unit of the third printing control apparatus includes: a display control unit that causes the plural pieces of logic sheet information to be displayed with index information, which is an index of the print attribute information set by the attribute information setting unit, on a display device; and a selecting unit that selects one piece of logic sheet information among the plural pieces of logic sheet information displayed by the display control unit, based on input data from the input device.

The present invention is also directed to a fourth printing control apparatus that sets various pieces of information used for printing by a predetermined printing device and causes the printing device to record print data according to the various pieces of information. The fourth printing control apparatus includes: a printing sheet information storage unit that stores plural pieces of printing sheet information that represent sizes of available printing sheets set in the printing device; an attribute information storage unit that stores print attribute information, which represents an attribute with respect to printing of the print data and does not change the sheet size, in a specific relation mapped to at least part of the plural pieces of printing sheet information stored in the printing sheet information storage unit; a display control unit that causes the plural pieces of printing sheet information to be displayed with the print attribute information of the specific relation on a display device; a selection unit that selects one piece of printing sheet information among the plural pieces of printing sheet information displayed by the display control unit, based on input data from an input device; and a printing information setting unit that sets the selected one piece of printing sheet information with the print attribute information, when the print attribute information has been set corresponding to the selected piece of printing sheet information, as the various pieces of information for printing.

In the fourth printing control apparatus of this structure, the operator previously sets the print attribute information, which does not change the sheet size, corresponding to the printing sheet information with the input device. When one piece of printing sheet information is selected by the selection unit, both the selected piece of printing sheet information and the corresponding print attribute information are set as the various pieces of information for printing.

Like the second printing control apparatus discussed above, the fourth printing control apparatus of the present invention facilitates the process of setting the print attribute information, which represents attributes relating to printing, for example, a layout of a plurality of pages in one printing plane, corresponding to the printing sheet information, thereby enhancing the convenience of the user.

In accordance with one preferable application, the selection unit of the fourth printing control apparatus includes: a display control unit that causes the plural pieces of printing sheet information to be displayed with index information, which is an index of the print attribute information set by the attribute information setting unit, on a display device; and a selecting unit that selects one piece of printing sheet information among the plural pieces of printing sheet information displayed by the display control unit, based on input data from the input device.

At least part of the objects of the present invention is also realized by a first printing control method that sets various pieces of information used for printing by a predetermined printing device and causes the printing device to record print data according to the various pieces of information. The first printing control method corresponds to the first printing control apparatus and includes the steps of: (a) providing plural pieces of logic sheet information that represent possible sheet sizes of the print data; (b) setting print attribute information, which represents an attribute with respect to printing of the print data, mapped to at least part of the plural pieces of logic sheet information provided in the step (a), based on input data from an input device; (c) selecting one piece of logic sheet information among the plural pieces of logic sheet information including the at least part of logic sheet information for which the print attribute information is set; and (d) setting the selected one piece of logic sheet information with the print attribute information, when the print attribute information has been set corresponding to the selected piece of logic sheet information, as the various pieces of information for printing.

Like the first printing control apparatus discussed above, the first printing control method facilitates the process of setting the print attribute information mapped to the logic sheet information and thereby enhances the convenience of the user.

The present invention is also directed to a second printing control method that sets various pieces of information used for printing by a predetermined printing device and causes the printing device to record print data according to the various pieces of information. The second printing control method corresponds to the second printing control apparatus and includes the steps of: (a) providing plural pieces of printing sheet information that represent sizes of available printing sheets set in the printing device; (b) setting print attribute information, which represents an attribute with respect to printing of the print data, mapped to at least part of the plural pieces of printing sheet information provided in the step (a), based on input data from an input device; (c) selecting one piece of printing sheet information among the plural pieces of printing sheet information including the at least part of printing sheet information for which the print attribute information is set; and (d) setting the selected one piece of printing sheet information with the print attribute information, when the print attribute information has been set corresponding to the selected piece of printing sheet information, as the various pieces of information for printing.

Like the second printing control apparatus discussed above, the second printing control method facilitates the process of setting the print attribute information mapped to the printing sheet information and thereby enhances the convenience of the user.

The present invention is further directed to a third printing control method that sets various pieces of information used for printing by a predetermined printing device and causes the printing device to record print data according to the various pieces of information. The third printing control method corresponds to the third printing control apparatus and includes the steps of: (a) providing plural pieces of logic sheet information, which represent possible sheet sizes of the print data, and print attribute information, which represents an attribute with respect to printing of the print data and does not change the sheet size, in a specific relation mapped to at least part of the plural pieces of logic sheet information; (b) causing the plural pieces of logic sheet information to be displayed with the print attribute information of the specific relation on a display device; (c) selecting one piece of logic sheet information among the plural pieces of logic sheet information displayed in the step (b), based on input data from an input device; and (d) setting the selected one piece of logic sheet information with the print attribute information, when the print attribute information has been set corresponding to the selected piece of logic sheet information, as the various pieces of information for printing.

Like the third printing control apparatus discussed above, the third printing control method facilitates the process of setting the print attribute information mapped to the logic sheet information and thereby enhances the convenience of the user.

The present invention is also directed to a fourth printing control method that sets various pieces of information used for printing by a predetermined printing device and causes the printing device to record print data according to the various pieces of information. The fourth printing control method corresponds to the fourth printing control apparatus and includes the steps of: (a) providing plural pieces of printing sheet information, which represent sizes of available printing sheets set in the printing device, and print attribute information, which represents an attribute with respect to printing of the print data and does not change the sheet size, in a specific relation mapped to at least part of the plural pieces of printing sheet information; (b) causing the plural pieces of printing sheet information to be displayed with the print attribute information of the specific relation on a display device; (c) selecting one piece of printing sheet information among the plural pieces of printing sheet information displayed in the step (b), based on input data from an input device; and (d) setting the selected one piece of printing sheet information with the print attribute information, when the print attribute information has been set corresponding to the selected piece of printing sheet information, as the various pieces of information for printing.

Like the fourth printing control apparatus discussed above, the fourth printing control method facilitates the process of setting the print attribute information mapped to the printing sheet information and thereby enhances the convenience of the user.

Another application of the present invention is a first computer program product for setting various pieces of information used for printing by a predetermined printing device and causing the printing device to record print data according to the various pieces of information. The computer program product comprises: a computer readable medium; and a computer program stored on the computer readable medium. The computer program comprises: a first program for causing a computer to set print attribute information, which represents an attribute with respect to printing of the print data, mapped to at least part of plural pieces of logic sheet information that are provided in advance to represent possible sheet sizes of the print data, based on input data from an input device; a second program for causing a computer to select one piece of logic sheet information among the plural pieces of logic sheet information including the at least part of logic sheet information for which the print attribute information is set; and a third program for causing a computer to set the selected one piece of logic sheet information with the print attribute information, when the print attribute information has been set corresponding to the selected piece of logic sheet information, as the various pieces of information for printing.

Like the first printing control apparatus and the first printing control method discussed above, the first computer program product facilitates the process of setting the print attribute information mapped to the logic sheet information and thereby enhances the convenience of the user.

The present invention is also directed to a second computer program product for setting various pieces of information used for printing by a predetermined printing device and causing the printing device to record print data according to the various pieces of information. The computer program product comprises: a computer readable medium; and a computer program stored on the computer readable medium. The computer program comprises: a first program for causing a computer to set print attribute information, which represents an attribute with respect to printing of the print data, mapped to at least part of plural pieces of printing sheet information that are provided in advance to represent size of available printing sheets set in the printing device, based on input data from an input device; a second program for causing a computer to select one piece of printing sheet information among the plural pieces of printing sheet information including the at least part of printing sheet information for which the print attribute information is set; and a third program for causing a computer to set the selected one piece of printing sheet information with the print attribute information, when the print attribute information has been set corresponding to the selected piece of printing sheet information, as the various pieces of information for printing.

Lice the second printing control apparatus and the second printing control method discussed above, the second computer program product medium facilitates the process of setting the print attribute information mapped to the printing sheet information and thereby enhances the convenience of the user.

The present invention is further directed to a third computer program product for setting various pieces of information used for printing by a predetermined printing device and causing the printing device to record print data according to the various pieces of information. The computer program product comprises: a computer readable medium; and a computer program stored on the computer readable medium. The computer program comprises: a first program for causing a computer to record plural pieces of logic sheet information, which represent possible sheet sizes of the print data; a second program for causing a computer to record print attribute information, which represents an attribute with respect to printing of the print data and does not change the sheet size, in a specific relation mapped to at least part of the plural pieces of logic sheet information; a third program for causing a computer to cause the plural pieces of logic sheet information to be displayed with the print attribute information of the specific relation on a display device; a fourth program for causing a computer to select one piece of logic sheet information among the plural pieces of logic sheet information displayed by third program, based on input data from an input device; and a fifth program for causing a computer to set the selected one piece of logic sheet information with the print attribute information, when the print attribute information has been set corresponding to the selected piece of logic sheet information, as the various pieces of information for printing.

Like the third printing control apparatus and the third printing control method discussed above, the third computer program product facilitates the process of setting the print attribute information mapped to the logic sheet information and thereby enhances the convenience of the user.

The present invention is also directed to a fourth computer program product for setting various pieces of information used for printing by a predetermined printing device and causing the printing device to record print data according to the various pieces of information. The computer program product comprises: a computer readable medium; and a computer program stored on the computer readable medium. The computer program comprises: a first program for causing a computer to record plural pieces of printing sheet information, which represent sizes of available printing sheets set in the printing device; a second program for causing a computer to record print attribute information, which represents an attribute with respect to printing of the print data and does not change the sheet size, in a specific relation mapped to at least part of the plural pieces of printing sheet information; a third program for causing a computer to cause the plural pieces of printing sheet information to be displayed with the print attribute information of the specific relation on a display device; a fourth program for causing a computer to select one piece of printing sheet information among the plural pieces of printing sheet information displayed by third program, based on input data from an input device; and a fifth program for causing a computer to set the selected one piece of printing sheet information with the print attribute information, when the print attribute information has been set corresponding to the selected piece of printing sheet information, as the various pieces of information for printing.

Like the fourth printing control apparatus and the fourth printing control method discussed above, the fourth com-

BRIEF DESCRIPTION OF THE DRAWINGS

FIG. 12 illustrates a 'User Attributes Registration' sub-window 48;

FIG. 13 shows the contents of a print attribute information table TBL;

FIG. 15 shows a pull-down menu 200 including options of sheet type information as index information.

DESCRIPTION OF THE PREFERRED EMBODIMENTS

Figure 1:
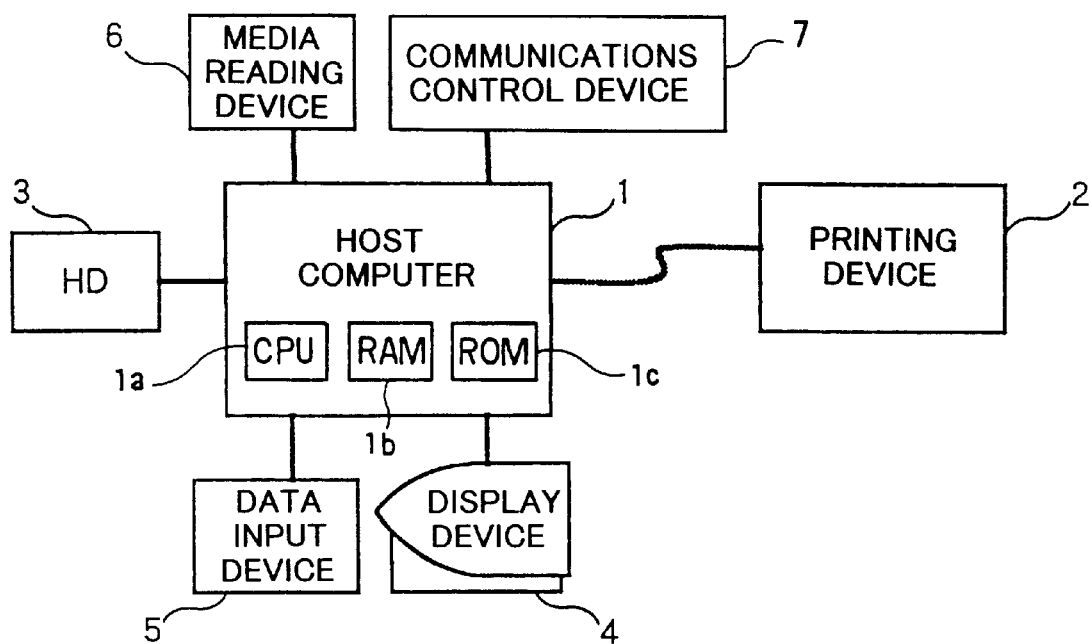
FIG. 1 schematically illustrates the structure of a printing system, to which the present invention is applied.

Referring to FIG. 1, the printing system includes a host computer 1 and a printing device 2, which are connected with each other via a printer cable. The printing device 2 receives print data and print attribute information output from the host computer 1, carries out a predetermined printing process, and creates an image on a printing sheet. The printing device 2 may be a serial printer, a page printer, or any other electronic duplicating printer. The connection with the host computer 1 may have a stand-alone configuration or a network configuration.

The host computer 1 executes, controls, and monitors a variety of programs through a predetermined system program. The host computer 1 includes a CPU (central processing unit) 1a, a RAM (random access memory) 1b, a ROM (read only memory) 1c, and an internal or external hard disk (HD) 3, which are arranged on a system board (not shown). The CPU 1a reads a required program from the HD 3 and carries out the required processing. Applications programs (hereinafter referred to as AP) for generating print data and format information and a printing control program (printer driver) for realizing the printing control apparatus of the present invention are recorded in the HD 3.

The host computer 1 is also connected with a display device 4 having a monitor, a data input device 5 for inputting various pieces of setting information, a media reading device 6 including a CD-ROM drive and a flexible disk drive (FDD), and a communications control device 7 functioning as an interface connecting with a network. The display device 4 is constructed to display a dialog window in response to an instruction of the system program, the AP, or the printing control program. The data input device 5 includes a keyboard, a mouse, and other pointing devices.

The printing control program is generally developed by a manufacturer of the printing device 2 and recorded in a flexible disk (FD) or a CD-ROM in a form readable by the host computer 1. When the printing device 2 is used, the host computer 1 reads the printing control program from the media reading device 6 and installs the printing control program in the HD 3. In accordance with another application, the printing control program supplied through the network is downloaded by the host computer 1 via the communications control device 7 and installed in the HD 3.

The host computer 1 reads and executes the printing control program to realize a printing control apparatus 10 embodying the present invention as discussed below.

Figure 2:
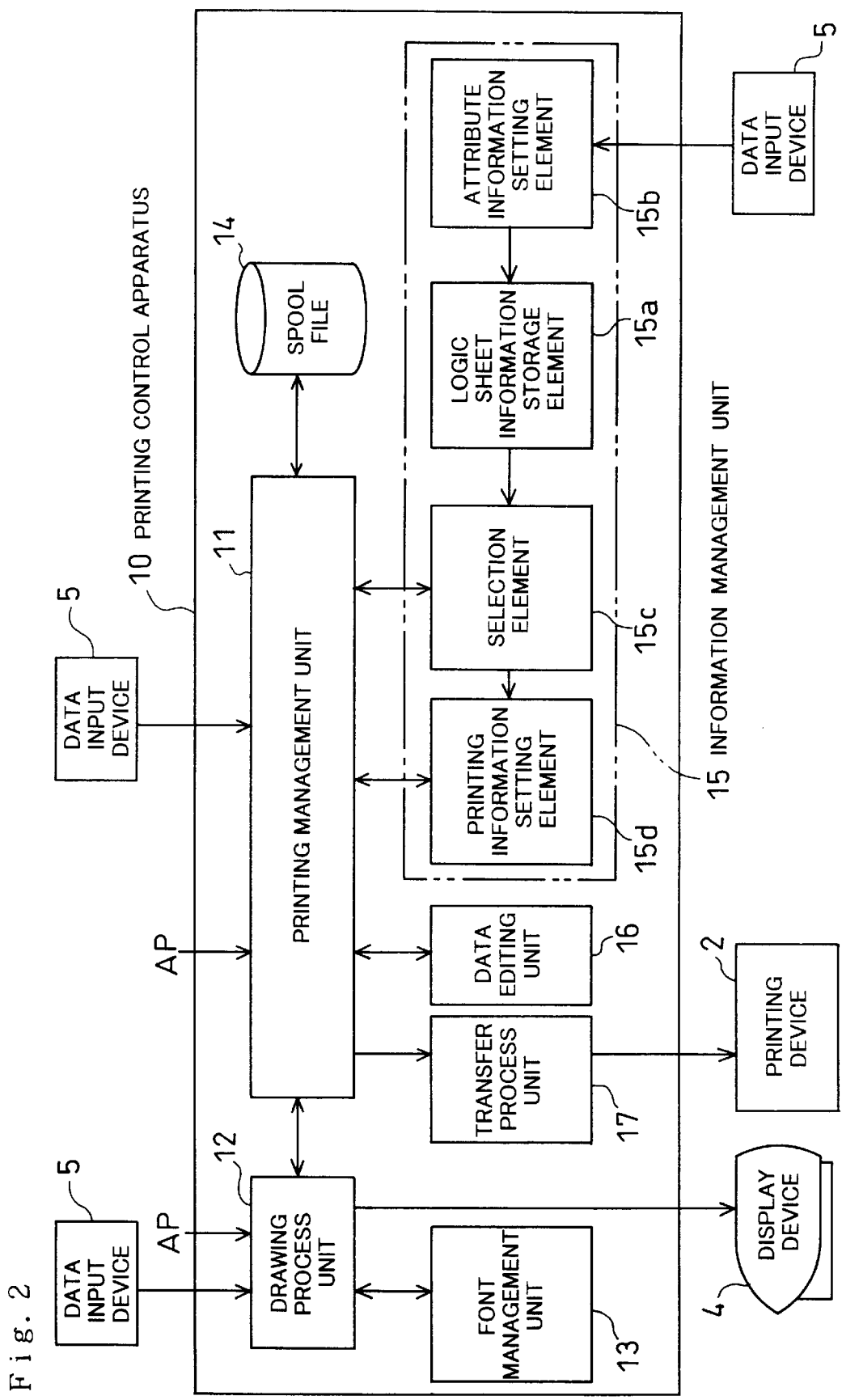
FIG. 2 is a block diagram illustrating a printing control apparatus embodying the present invention.

Referring to FIG. 2, the printing control apparatus 10 has functional blocks of a printing management unit 11, a drawing process unit 12, a font management unit 13, a spool file 14, an information management unit 15, a data editing unit 16, and a transfer process unit 17. The information management unit 15 includes a logic sheet information storage element 15a, an attribute information setting element 15b, a selection element 15c, and a printing information setting element 15d. Only the essential constituents to realize the present invention are illustrated in the drawing of FIG. 2.

The printing management unit 11 carries out the comprehensive printing control in the printing control apparatus 10, understands the inputs from the AP or the data input device 5 to generate bit-map data, and carries out conversion into control codes to enable the printing device 2 to carry out the printing process. This is generally referred to as the printing manager.

The drawing process unit 12 causes a dialog window for sheet settings or other settings and required image data to be displayed on the display device 4 and makes the settings input through the operation of the data input device 5 reflect on the displayed image in the dialog window. Required font data are extracted from the font management unit 13, in order to create the image data.

The spool file 14 temporarily stores the print data or the format information created by the AP (spool process). The information management unit 15 sets various pieces of information for printing (hereinafter referred to as the printing information) corresponding to the model of the printing device 2. The functions of the respective elements 15a through 15d included in the information management unit 15 will be described later.

The data editing unit 16 edits image data or bit map data based on the print data and the format information according to the contents of the printing information set by the information management unit 15. The transfer process unit 17 transfers the control codes output from the printing management unit 11 to the printing device 2.

Figure 3:
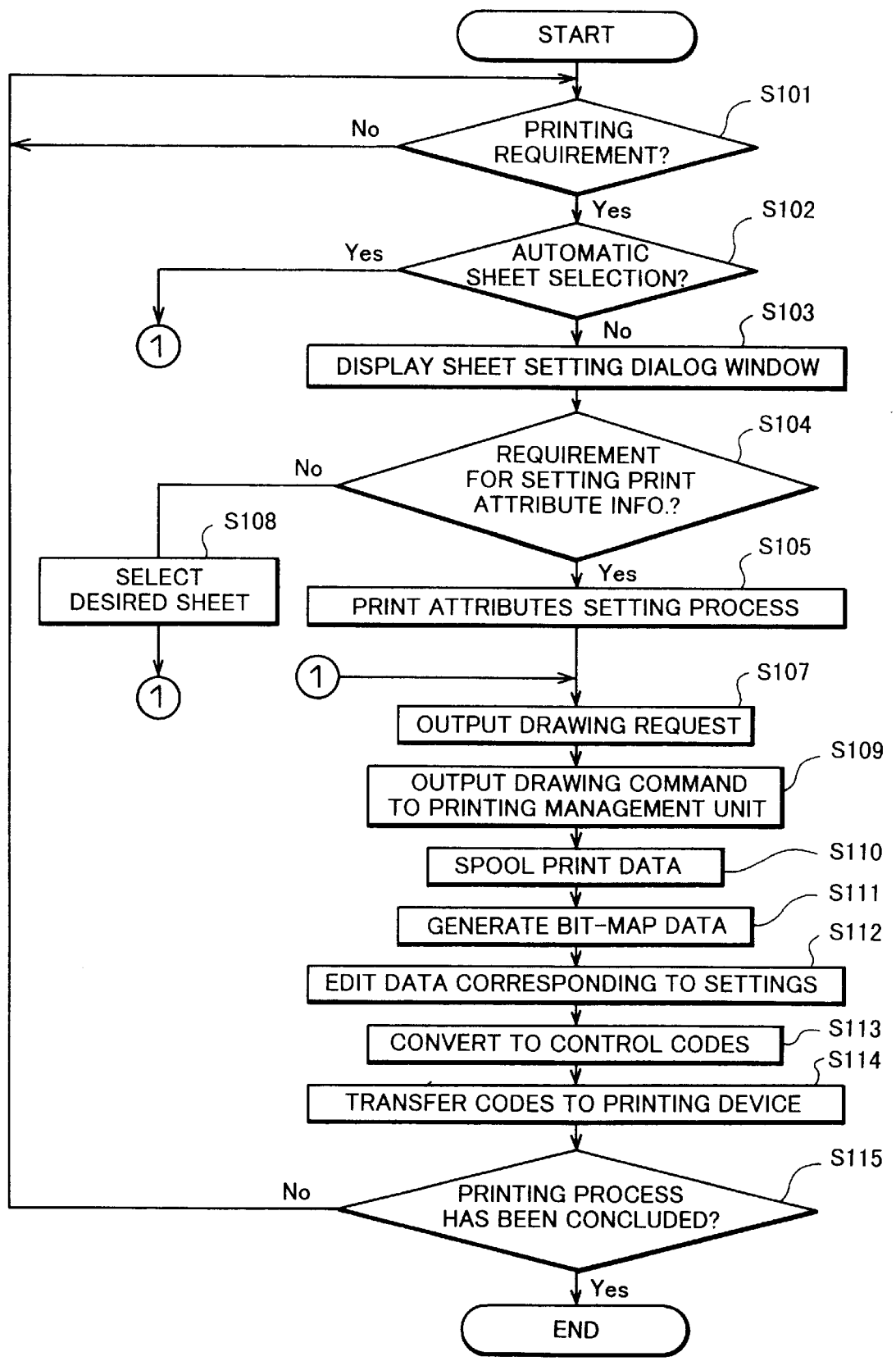
FIG. 3 is a flowchart showing a processing routine executed by the printing control apparatus of the embodiment.

The following describes a process prior to actual printing in the printing device 2, in response to a printing requirement output with the print data and the format information by the AP. FIG. 3 is a flowchart showing a processing routine carried out in the printing control apparatus 10, especially by the printing management unit 11 and the information management unit 15.

In the routine of FIG. 3, in response to a printing requirement input from the data input device 5 at step S101, the CPU 1a of the host computer 1 determines whether or not automatic sheet selection is carried out at step S102. The automatic sheet selection implies that sheet information specified by the AP or the OS (operating system) is used. The sheet information includes logic sheet information and printing sheet information and is specified according to the settings of print attribute information, which are informed in advance. The logic sheet information, the printing sheet information, and the print attribute information will be described later. When it is determined at step S102 that the automatic sheet selection is not carried out, the CPU 1a drives the drawing process unit 12 to display a sheet setting dialog window on the display device 4 at step S103. This enables manual sheet selection by the operator.

Figure 4:
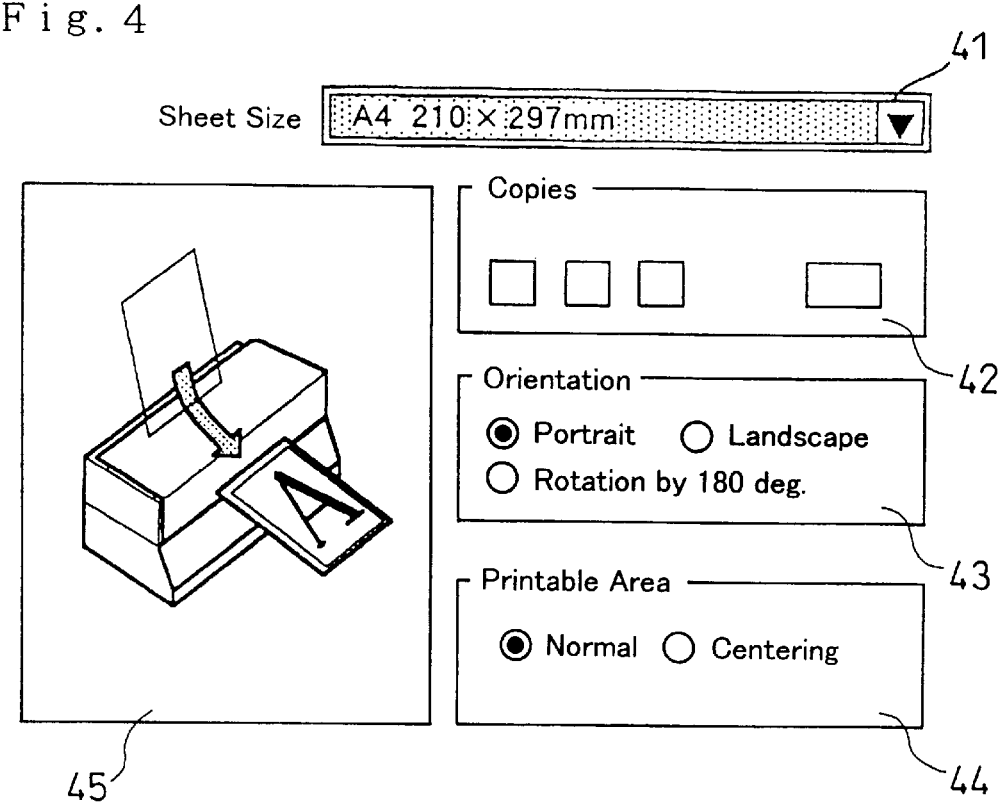
FIG. 4 illustrates a 'Logic Sheet Setting' dialog window.

The sheet setting dialog window displayed on the display device 4 is described in detail. FIG. 4 illustrates a 'Logic Sheet Setting' dialog window, which is one of the sheet setting dialog windows. The 'Logic Sheet Setting' dialog window includes data input areas or dialog boxes 41, 42, 43, and 44 for respectively setting a 'Sheet Size', a 'Number of Copies', an 'Orientation', and a 'Printable Area' and a display area 45 for displaying the settings as a print form image of the printing device 2.

Figure 5:
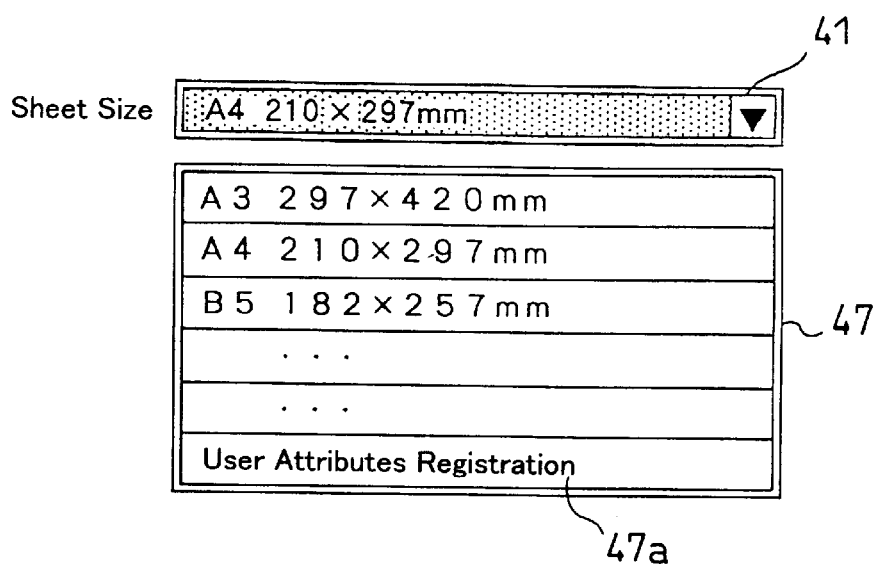
FIG. 5 shows a pull-down menu 47 opened from a 'Sheet Size' dialog box 41.

The 'Sheet Size' dialog box 41 sets the sheet size of an original print expressed by the print data as well as the type of sheet. One concrete procedure selects one among a plurality of options provided in the form of a pull-down menu 47 as shown in FIG. 5. The sheet of the original print expressed by the print data is herein referred to as the 'logic sheet', and the size of the logic sheet corresponds to the 'logic sheet information'. Plural pieces of logic sheet information are provided as options in the pull-down menu 47. The option provided as a default represents logic sheet information without any print attributes, for example, 'A3 297×420 mm', 'A4 210×297 mm', and 'B5 182×257 mm'. The operator can add registration to these options according to the method described later.

The 'Number of Copies' dialog box 42 sets the desired number of copies and specifies the collation and the sequence of printing by clicking the check boxes. The 'Orientation' dialog box 43 represents the orientation of the printing image, which is selectable among options of 'Portrait', 'Landscape', and 'Rotation by 180 degrees'. The option 'Rotation by 180 degrees' can be specified in addition to the 'Portrait' or 'Landscape'. This allows a printing image whose orientation is specified as the 'Portrait' or 'Landscape' to be rotated by 180 degrees.

The 'Printable Area' dialog box 44 sets a printable area on the printing sheet, which is selectable between options of 'Normal' and 'Centering'. The 'Centering' option implies a process of transmitting information of a printing area having identical top and bottom margins and identical right and left margins to the AP.

Figure 6:
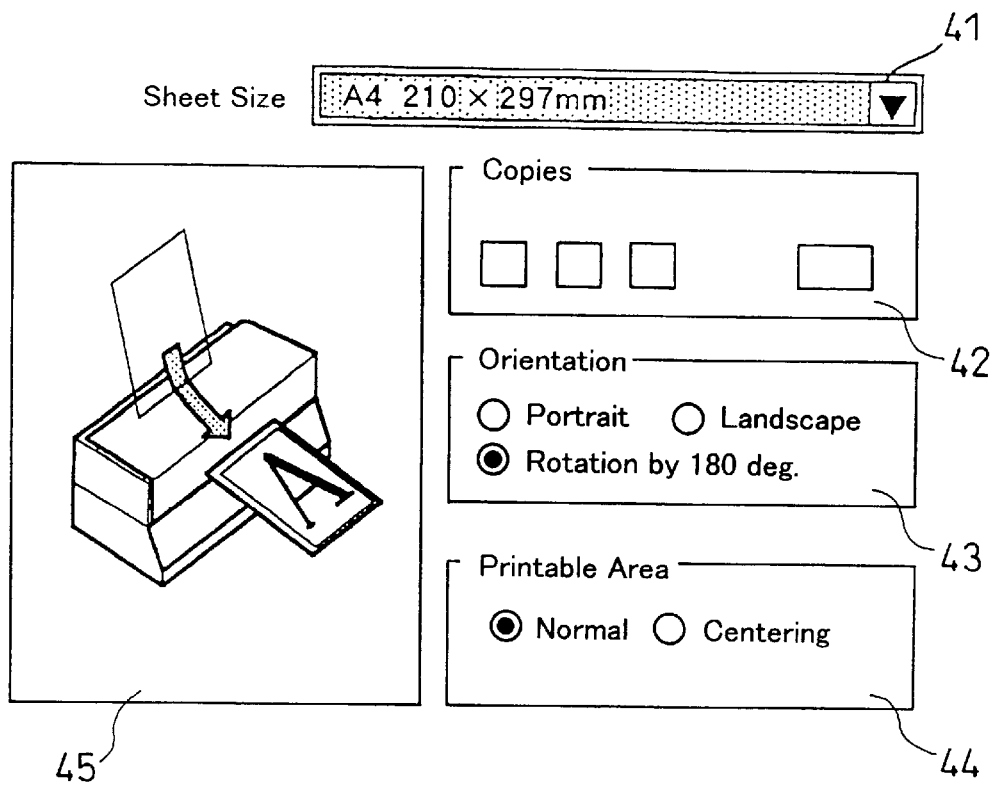
FIG. 6 shows the state in which part of the settings has been changed in the dialog window of FIG. 4.

The print form image displayed in the display area 45 is created by the drawing process unit 12. When the settings of the data input areas 41 through 44 are updated, the contents of the image corresponding to the updated settings are automatically drawn. By way of example, when the operator further specifies the 'Rotation by 180 degrees' in the 'Orientation' dialog box 43 from the 'Portrait' is being selected as shown in FIG. 4, the orientation of the printing sheet is changed accordingly in the print form image. FIG. 6 shows the display of the dialog window based on the updated settings, where the printing sheet in the display area 45 is rotated by 180 degrees.

The display of the print form image enables the operator to readily understand how the updated settings reflect on the resulting print.

Figure 7:
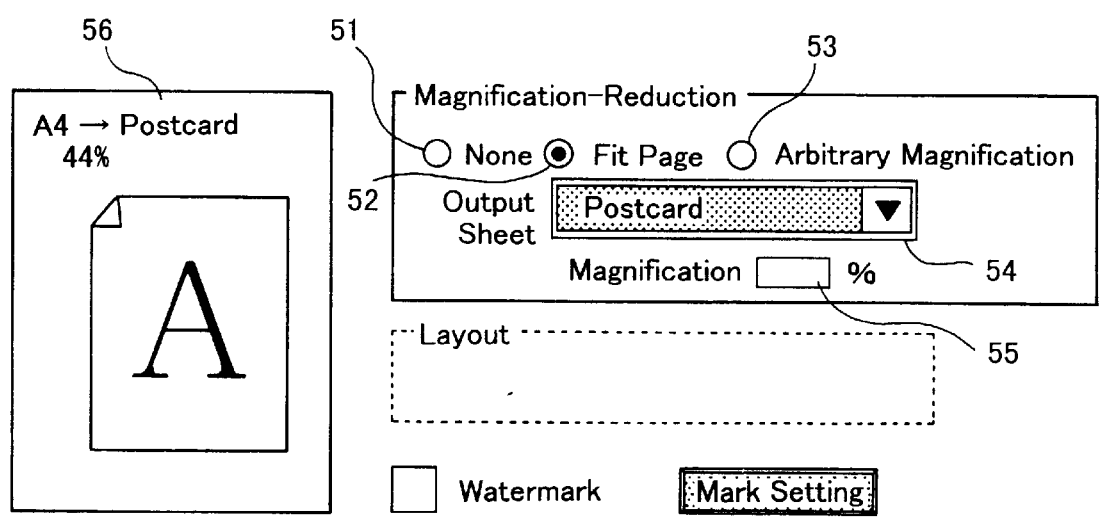
FIG. 7 shows a 'Fit Page' option for automatic magnification-reduction.
Figure 8:
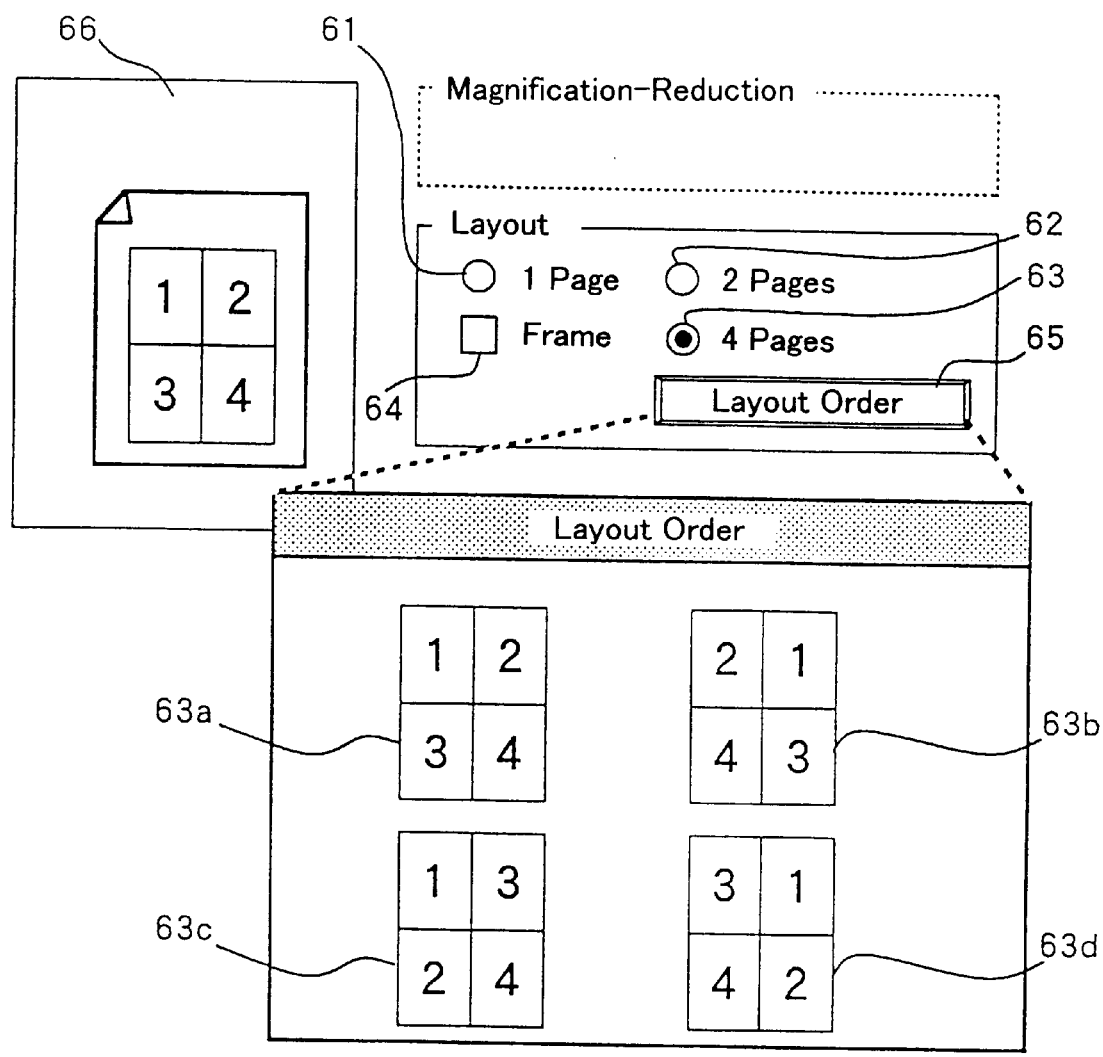
FIG. 8 shows a dialog box for setting the number of pages laid out in one printing plane and the sequence of layout arrangement.
Figure 9:
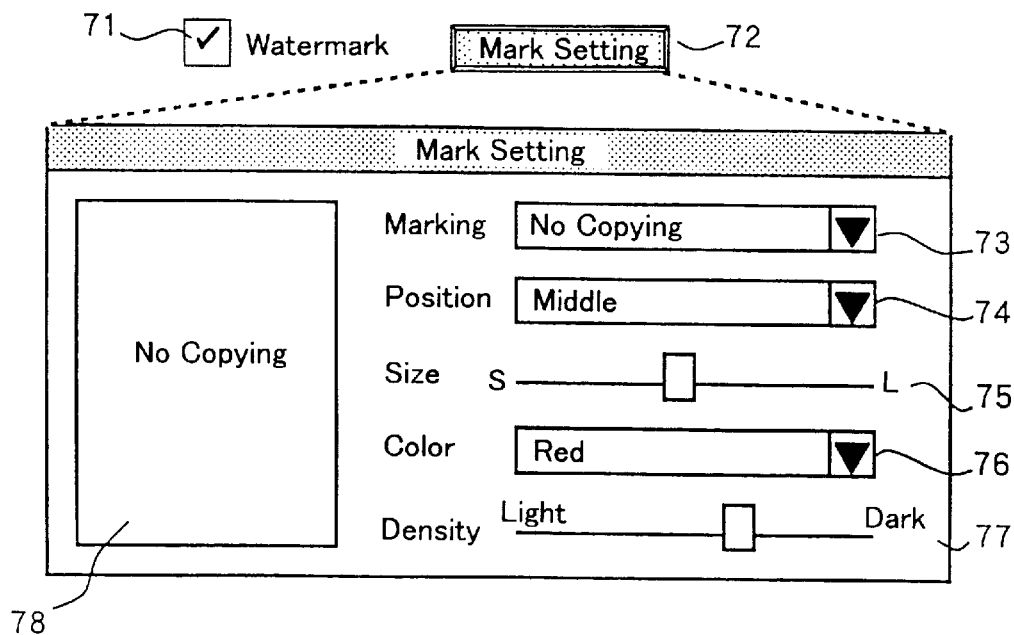
FIG. 9 shows a sub-window for setting the details of watermark printing.

A 'Layout' dialog window including its sub-windows is a selectable option other than the 'Logic Sheet Setting' dialog window as the sheet setting dialog window. FIGS. 7 through 9 show part of the 'Layout' dialog window and its sub-windows. In this example, information relating to magnification-reduction, a layout, and watermark printing is specified on the 'Layout' dialog window.

The magnification-reduction is carried out when either an option button 'Fit Page' 52 or an option button 'Arbitrary Magnification' 53 is clicked on a Magnification-Reduction dialog box shown in FIG. 7. The size of a printing sheet actually set in the printing device 2 is specified in an Output Sheet dialog box 54. By way of example, when the size of the logic sheet is A4 and the postcard is selected in the Output Sheet dialog box 54, the option 'Fit Page' automatically changes the layout of the print data (for example, the number of rows, the number of columns, the number of letters, and the margins), which is prepared according to the format information of the A4 size, linearly corresponding to the size of the postcard. The option 'Arbitrary Magnification', on the other hand, enables the operator to specify an arbitrary magnification. The arbitrary magnification is set in a Magnification dialog box 55. The settings of the magnification-reduction are displayed in a display area 56 of the print form image. When the settings are updated, the corresponding portions of the print form image (the respective sheet sizes and the magnification-reduction ratio in this example) are changed. In the example illustrated in FIG. 7, reduction from the A4 size to the postcard size is selected, where the reduction ratio is 44%.

This structure enables the operator to confirm the settings visually and does not require the operator to know the magnification-reduction ratio like the conventional apparatus, thereby improving the operability. By way of example, when the operator specifies an originally unprintable size by the printing device 2, for example, a large size as A2, as the logic sheet size, this function enables the specified logic sheet size to be automatically reduced to a printable size like A4 having an appropriate layout.

When an option button 'None' 51 is clicked on the Magnification-Reduction dialog box, the layout becomes valid while the magnification-reduction is invalid. In this example, the number of pages laid out in one printing plane of the printing sheet is specified by clicking one of an option button '1 Page' 61, an option button '2 Pages' 62, and an option button '4 Pages' 63 as shown in FIG. 8. These numbers of pages may be changed arbitrarily. A 'Frame' check box 64 determines whether or not a frame is printed on the boundaries of the respective pages laid out simultaneously in the same printing plane.

After either the option button '2 Pages' 62 or the option button '4 Pages' 63 is clicked, a 'Layout Order' dialog box 65 becomes valid. The sub-window of FIG. 8 shows an example where the option button '4 Pages' 63 is clicked. In this case, the operator can select desired one among four layout images 63a through 63d representing the sequence of layout arrangement. Coordinate information representing possible page layouts after the size reduction are assigned to the respective layout images 63a through 63d. When the operator selects one of the layout images, the coordinate information corresponding to the selected layout image is stored together with the other settings. This facilitates the conversion of coordinates carried out by the data editing unit 16 as described later. The operator can occasionally check the settings of the layout, which is displayed as a print form image in a display area 66.

FIG. 9 shows a sub-window for setting the details of watermark printing. Although the settings of the watermark printing are specified in the 'Layout' dialog window in this example, the setting may be carried out in the 'Logic Sheet Setting' dialog window.

The operator first clicks a 'Watermark' check box 71 to make the watermark function valid. In the case where mark relating information has not yet been set or in the case where the preset information is to be changed, the operator clicks a 'Mark Setting' dialog box 72 with the pointing device of the data input device 5 to display the sub-window shown in FIG. 9. The sub-window includes a Marking dialog box 73 for selecting a desired marking among options registered in advance, a Position dialog box 74 for selecting a desired printing position among options, High, Middle, and Low, a Size lever 75 for setting a desired size of the marking, a Color dialog box 76 for selecting a desired color of the marking among options registered in advance, and a Density lever 77 for setting a desired printing density of the marking. These settings are specified according to the application of printing. The operator can check the settings in a print form image displayed in a display area 78 in the WYSIWYG manner.

Figure 10:
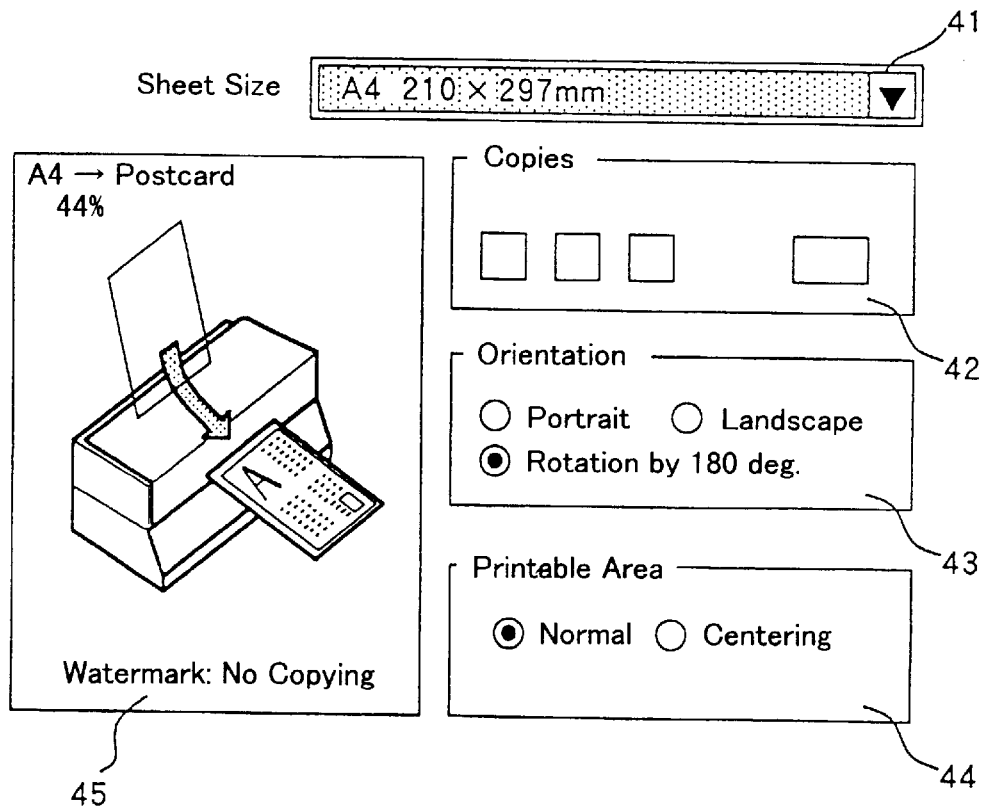
FIG. 10 illustrates the dialog window in which the settings of the logic sheet and the printing sheet reflect on each other.

The settings specified in the 'Logic Sheet Setting' dialog window and the 'Layout' dialog window mutually reflect on the print form images displayed in these dialog windows. For example, the setting of the layout and watermark printing specified in the 'Layout' dialog window reflect on the print form image displayed in the 'Logic Sheet Setting' dialog window shown in FIG. 10. The operator can thus readily check the final settings after the individual setting of arbitrary portions.

Referring back to the flowchart of FIG. 3, at step S103, the 'Logic Sheet Setting' dialog window is displayed as the sheet setting dialog window described with the drawings of FIGS. 4 through 10.

The CPU 1a then determines whether or not there is a requirement for setting the print attribute information corresponding to the logic sheet information specified in the 'Logic Sheet Setting' dialog window at step S104. The print attribute information represents the attributes with respect to printing of the print data and, in this embodiment, includes pieces of information regarding 'Orientation', 'Printable Area' 'Magnification-Reduction', 'Layout', and 'Watermark'. concrete procedure of step S104 determines whether or not a 'User Attributes Registration' option 47a in the pull-down menu 47 opened from the 'Sheet Size' dialog box 41 as shown in FIG. 5 is clicked by the data input device 5. In the case where the 'User Attributes Registration' option 47a is clicked, the CPU 1a determines that there is a requirement for setting the print attribute information corresponding to the logic sheet information and proceeds to step S105 to carry out a print attributes setting process.

Figure 11:
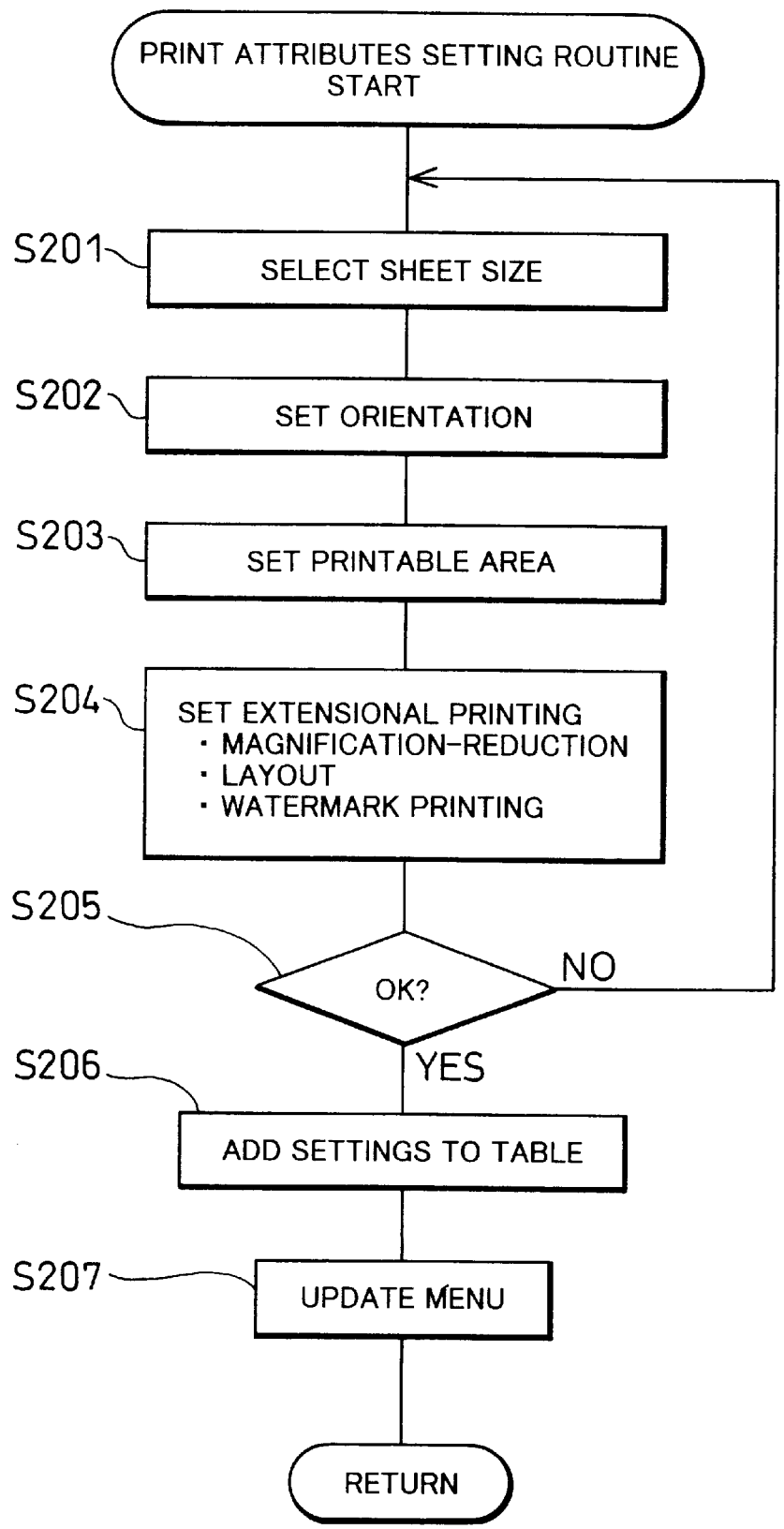
FIG. 11 is a flowchart showing a routine of setting print attributes.

FIG. 11 is a flowchart showing the details of the print attributes setting process carried out at step S105 in the flowchart of FIG. 3. The CPU 1a first selects the sheet size as the logic sheet information at step S201. A concrete procedure displays a 'UserAttributes Registration' sub-window 48 as shown in FIG. 12 on the display device 4 and receives an instruction regarding the sheet size specified in the 'User Attributes Registration' sub-window 48 through the operation of the data input device 5, so as to select a desired sheet size. The sheet sizes displayed as options in the 'User Attributes Registration' sub-window 48 represent the current settings of the logic sheet information and identical with the contents of the pull-down menu 47 opened from the 'Sheet Size' dialog box 41 as shown in FIG. 5.

Referring back to the flowchart of FIG. 11, the CPU 1a sets the orientation or printing direction at step S202, the printable are a at step S203, and the information on extensional printing at step S204, based on the data successively input through the operation of the data input device 5. The orientation and the printable area are set corresponding to the specification input in the 'Orientation' dialog box 43 and the 'Printable Area' dialog box 44 in the 'Logic Sheet Setting' dialog window. The information on extensional printing is set corresponding to the specification input in the 'Layout' dialog window and includes pieces of information regarding magnification-reduction, a layout, and watermark printing. In the case where the corresponding data are not newly input, the default is specified for the settings. By way of example, in the magnification-reduction, information on the output sheet or printing sheet having the same size as that of the logic sheet is specified as the default.

After the series of print attribute information regarding the orientation, the printable area, the magnification-reduction, the layout, and the watermark printing is set at steps S202 through S204, it is determined at step S205 whether or not these settings are appropriate. When it is determined that the settings are not appropriate, the program returns to step S201 to carry out the selection and setting again. When it is determined at step S205 that the settings are appropriate, on the other hand, the program proceeds to step S206.

At step S206, the CPU 1a adds the contents of the print attribute information to a print attribute information table TBL and thereby sets the print attribute information corresponding to the logic sheet information selected at step S201. FIG. 13 shows an example of the print attribute information table TBL stored in the RAM 1b. In the print attribute information table TBL, field ID numbers are assigned to the respective fields to specify the size of the logic sheet (logic sheet information), the size of the printing sheet (printing sheet information), the magnification-reduction ratio, the watermark printing, and the other settings. A concrete procedure of step S206 adds a new field including the sheet size selected at step S201 in the column of logic sheet information to the print attribute information table TBL, and sequentially records the print attribute information regarding the orientation, the printable area, the magnification reduction, the layout, and the watermark printing set at steps S202 through S204 in the subsequent columns of the new field. The data in the column of printing sheet information is obtained in the course of specification of magnification-reduction. In the case where the magnification-reduction is not carried out, the setting in the column of printing sheet information is identical with the setting in the column of logic sheet information. At step S206, the field ID number assigned to this new field is stored temporarily.

Figure 14:
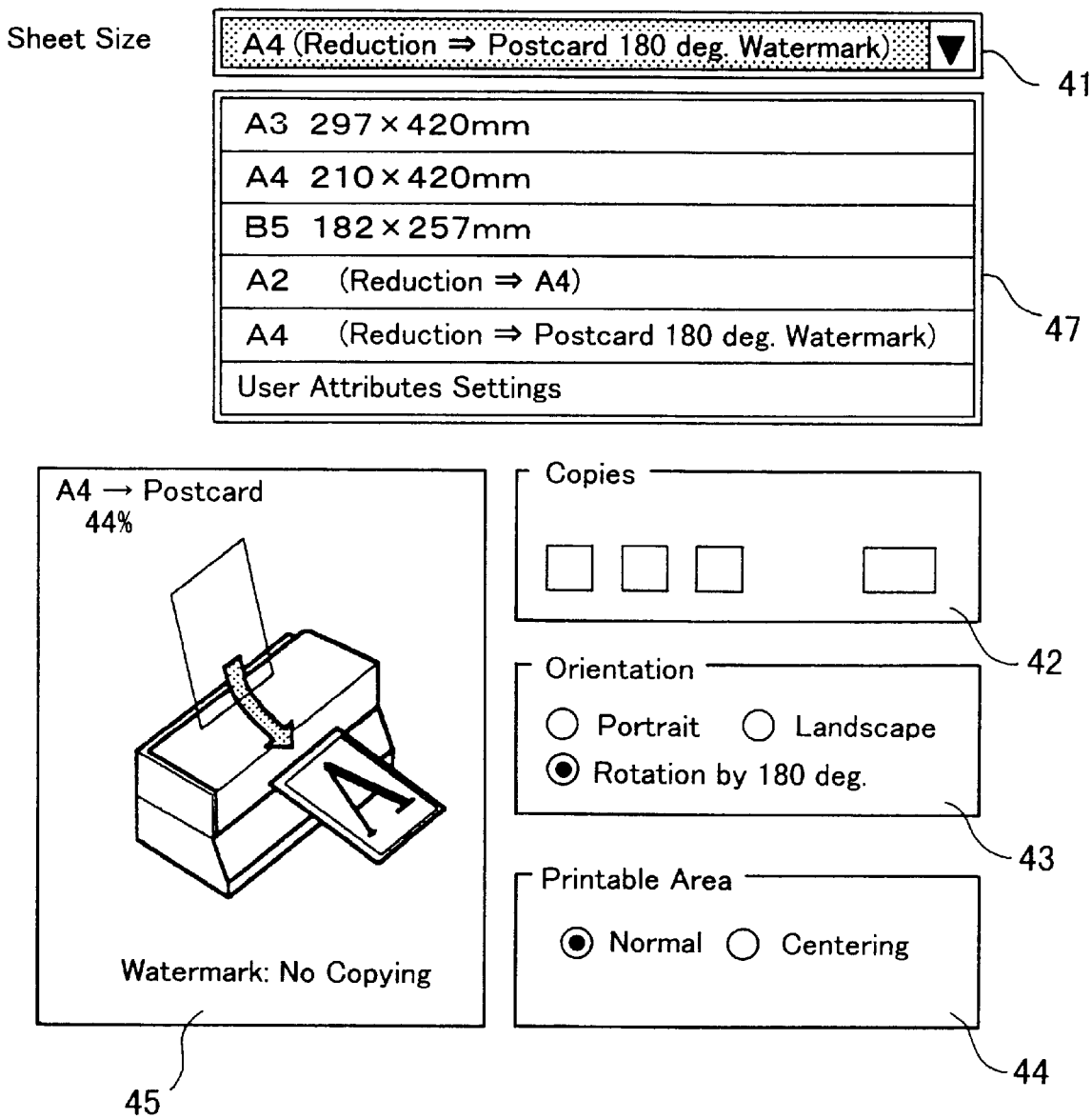
FIG. 14 illustrates the pull-down menu 47 updated with the contents of the print attribute information table TBL shown in FIG. 13.

The CPU 1a then updates the pull-down menu 47 opened from the 'Sheet Size' dialog box 41, based on the contents of the print attribute information table TBL at step S207. FIG. 14 shows the updated pull-down menu 47 with the contents of the print attribute information table TBL shown in FIG. 13.

In the illustrated example, the operator sets a reduction to the postcard size and selects the logic sheet of the A4 size with the print attribute information, which represents a rotation by 180 degrees as the orientation and watermark printing. These settings are stored in the print attribute information table TBL, and the new item 'A4 (Reduction→Postcard 180 deg. Watermark) is additionally registered in the pull-down menu 47 based on the updated contents of the print attribute information table TBL. The description '(Reduction→Postcard 180 deg. Watermark)' in this item corresponds to index information, which is an index of the print attribute information stored in the print attribute information table TBL. The operator can visually check the settings of the logic sheet in the print form image displayed in the display area 45. The contents of the print form image are modified with a change of the sheet type.

After the pull-down menu 47 is updated at step S207, the CPU 1a goes to RETURN and exits from this print attribute setting routine. The CPU 1a then proceeds to step S107 in the flowchart of FIG. 3, at which the AP outputs a drawing request for the printing device to the drawing process unit 12. When it is determined that there is no requirement for setting the print attribute information at step S104, the program proceeds to step S108 to input a desired sheet size selected by the operator in the pull-down menu 47, which is opened from the 'Sheet Size' dialog box 41 as shown in FIG. 14, through the operation of the data input device 5. A concrete procedure of step S108 selects a desired piece of logic sheet information with the print attribute information corresponding to the selected sheet size out of the print attribute information table TBL and stores the field ID number assigned to the selected piece of logic sheet information. After the execution of step S108, the program immediately proceeds to step S107. When it is determined at step S102 that the automatic sheet selection is carried out, the program also goes to step S107.

The drawing process unit 12 outputs a drawing command to the display device 4 and the printing management unit 11 at step S109. The printing management unit 11 temporarily stores the print data and the format information relating to this drawing command into the spool file 14. After the spool of all the print data has been concluded at step S110, the CPU 1a successively reads the print data from the spool file 14 and generates bit-map data at step S111. The data editing unit 16 edits the bit-map data based on the contents of a desired field in the print attribute information table TBL stored in the RAM 1b at step S112.

A concrete procedure of step S112 specifies a desired field in the print attribute information table TBL according to the field ID number stored either at step S206 in the print attribute setting routine of FIG. 11 or at step S108 in the main routine of FIG. 3, reads the logic sheet information, the printing sheet information, and the print attribute information registered in the specified field, and edits the bit-map data based on these pieces of information.

Editing is carried out in the following manner. In the case where the 'Fit Page' option is selected, the data editing unit 16 automatically computes the magnification-reduction ratio and edits the bit-map data to be magnified or reduced linearly from the center of the printing area at the calculated magnification-reduction ratio. In the case where the 'Arbitrary Magnification' option is selected, on the other hand, the data editing unit 16 edits the bit-map data to be magnified or reduced linearly from the upper left corner of the printing sheet at the arbitrary magnification. The calculated magnification-reduction ratio is automatically added to the print form image displayed in the display area 56.

When the number of pages laid out in one printing plane and the sequence of layout arrangement are specified, the data editing unit 16 edits the bit-map data corresponding to the number of laid-out pages to be reduced linearly, for example, by the data skipping technique, and determines the coordinates of a reduced bit-map image having the specified sequence of layout arrangement based on the coordinate information described above.

When the rotational angle is specified as the orientation, the data editing unit 16 changes the direction of the bit-map data according to the specified rotational angle. When the watermark printing is specified, the data editing unit 16 reads watermark information regarding a desired watermark and the specification of the watermark from a watermark information table (not shown) and superposes the watermark information and the coordinate information upon the bit-map data.

In response to a notification regarding conclusion of edition of the bit-map data output from the data editing unit 16, the printing management unit 11 converts the edited bit-map data into control codes at step S113 and successively transmits the control codes to the transfer process unit 17. The transfer process unit 17 then transfers the input control codes to the printing device 2 at step S114. The printing device 2 translates the transferred control codes and carries out a required printing process. The series of processing described above is repeated until the printing process has been concluded at step S115.

The printing control apparatus 10 of this embodiment realizes printing control with the displayed print form image. In this embodiment, the logic sheet information storage element 15a in the information management unit 15 corresponds to the column of logic sheet information in the print attribute information table TBL stored in the RAM 1b. The attribute information setting element 15b is realized by the CPU 1a and the processing of steps S201 through S207 executed by the CPU 1a. The selection element 15c is realized by the CPU 1a and the processing of step S108 executed by the CPU 1a. The printing information setting element 15d is realized by the CPU 1a and the processing of step S112 executed by the CPU 1a.

In the printing system of this embodiment, the operator presets the print attribute information corresponding to the logic sheet information through the operation of the data input device 5 (steps S201 through S207 in the flowchart of FIG. 11). The operator simply selects a desired piece of logic sheet information in the pull-down menu 47 (step S108 in the flowchart of FIG. 3), which is opened from the 'Sheet Size' dialog box 10 41, in order to set the desired piece of logic sheet information with the print attribute information. The bit-map data corresponding to the print data are edited with the logic sheet information and the print attribute information (step S112 in the flowchart of FIG. 3).

In the printing system of this embodiment, the operator simply selects a desired piece of logic sheet information, in order to set the print attribute information regarding the orientation, the printable area, the magnification-reduction, the layout, and the watermark printing. This arrangement attains the excellent operatability and enhances the convenience of the user. In the embodiment, the pull-down menu 47 is used for the selection of the logic sheet information. This enables the operator to readily understand options of the logic sheet information and select a desired option.

In the embodiment described above, the print attribute information is specified through the setting environment formed by the dialog window displayed in the display device 4. This enables the operator to visually check the specified or updated settings in the displayed print form image.

There are some possible modifications of the above embodiment. In the embodiment, the print attribute information is set corresponding to the logic sheet information. One modified arrangement stores possible sizes of printing sheets (printing sheet information), which are input from the Output Sheet dialog box 54 in the 'Layout' dialog window, in the form of a table and sets the print attribute information corresponding to the printing sheet information stored in this table. In this modified structure, the operator simply selects a desired piece of printing sheet information, in order to set the desired piece of printing sheet information with the print attribute information. This also facilitates the process of setting the print attribute information and thereby enhances the convenience of the user.

In the embodiment described above, the print attribute information is set corresponding to the logic sheet information in response to a user' s instruction. One modified arrangement provides the logic sheet information with the print attribute information set in advance corresponding thereto. In this case, the print attribute information table TBL shown in FIG. 13 and the pull-down menu 47 shown in FIG. 14 are stored in advance in the ROM 1c. It is preferable that the modified structure provides the print attribute information table TBL and the pull-down menu 47 by taking into account all the possible combinations of all pieces of print attribute information and all printing sheets that can be set in the 'Layout' dialog window.

Like the above embodiment, this modified structure enables the operator to specify the print attribute information corresponding to a desired piece of logic sheet information simply by selecting the desired piece of logic sheet information. This facilitates the process of setting the print attribute information and thereby enhances the convenience of the user. This structure especially facilitates the process of setting specific pieces of print attribute information that do not change the sheet size, in addition to the print attribute information that changes the sheet size, for example, magnification-reduction.

In this modified structure that provides the logic sheet information with the print attribute information set in advance corresponding thereto, the printing sheet information may replace the logic sheet information. In this case, the printing sheet information with the print attribute information corresponding thereto is stored in advance in the table opened from the Output Sheet dialog box 54 in the 'Layout' dialog window. In the case where the magnification-reduction of the sheet size is not required, this structure also improves the operatability and enhances the convenience of the user.

The above embodiment makes the settings of the print attribute information reflect on the print form image for convenience of the sheet setting procedure. One possible modification makes the settings valid only through the internal processing. For example, in the examples of FIGS. 4 through 10 and FIG. 14, the dialog windows may include only the dialog boxes without the display areas 45, 56, and 78 of the print form image.

In the above embodiment, the print attribute information includes the information regarding the orientation, the printable area, the magnification-reduction, the layout, and the watermark printing. Any pieces of information representing the characteristics of printing of the print data may, however, be used as the print attribute information. Available examples of the print attribute information include color correction information, which is used when image information (tone data) converted to color information in the unit of dots is subjected to color correction according to the characteristics of colorimetry of the printing device 2, and information regarding the half toning process that expresses the density of a certain area by the presence or non-presence of ink in the unit of dots based on the color-corrected image information. Other available examples are information regarding the sheet feeding process, such as interlace and overlap.

In the above embodiment, the index information, for example, '(Reduction→Postcard 180 deg. Watermark)', displayed in the display device 4 directly represents the contents of the print attribute information. Another available example of the index information does not directly represent the contents of the print attribute information but unequivocally specifies the print attribute information. FIG. 15 shows a pull-down menu 200 including an option of such index information. The item 'A4 (Gloss Paper)' is registered in the sixth row of the pull-down menu 200. The 'Gloss Paper' in this item corresponds to the index information. Namely the type of the printing sheet set in the printing device 2 is used as the index information in this example.

Different types of the printing sheets, for example, standard paper and gloss paper, have different color development properties and water absorption properties. Different look-up tables for color correction may accordingly be provided corresponding to the different types of the printing sheets, in order to adjust the color balance and the amounts of ink supplies of C, M, Y, and K. Different types of the printing sheets also have different drying rates of ink. The number of overlaps obtained by recording one raster in a plurality of paths is accordingly increased with a decrease in drying rate, in order to improve the picture quality. In this manner, the look-up table for optimum color correction and the number of overlaps are favorably determined according to the information regarding the type of the printing sheet. In this modified arrangement, the type of the printing sheet is displayed as the index information in the pull-down menu 200. In this case, the contents of the print attribute information table TBL shown in FIG. 13 include the color correction information, the overlap information, or other pieces of print attribute information specified by the index information. This structure enables the operator to set the color correction information, the overlap information, or other pieces of print attribute information simply by selecting an option in the pull-down menu 200, which includes the information regarding the type of the printing sheet set in the printing device 2, for example, 'A4 (Gloss Paper)', as shown in FIG. 15.

The index information is not restricted to the information regarding the type of the printing sheet, but may be any index that unequivocally specifies the print attribute information. One possible example uses the operator's name for the index that unequivocally specifies the print attribute information and is displayed as an option in the pull-down menu 200.

The present invention is not restricted to the above embodiment or its modifications, but there may be many other modifications, changes, and alterations without departing from the scope or spirit of the main characteristics of the present invention.

What is claimed is:

1. A printing control apparatus that sets various pieces of information used for printing by a predetermined printing device based on input data from an input unit, which receives instructions given by a user, and causes said printing device to record print data according to the various pieces of information, said printing control apparatus comprising:

an available settings storage unit configured to store plural pieces of logic sheet information that represent possible sheet sizes of the print data as a plurality of available settings of sheet information;

a display control unit configured to display the plurality of available settings stored in said available settings storage unit in a sheet information input dialog box;

an available settings addition unit configured to specify, based upon the input data from said input unit, print attribute information which represents an attribute with regard to printing of the print data and which is mapped to one of the plural pieces of logic sheet information stored in said available settings storage unit, and to add an item to be displayed by the display control unit, the item reflecting information including the specified print attribute information and the mapped logic sheet information as newly available settings to be displayed;

a selection unit configured to select based on the input data from said input unit one available setting among the plurality of available settings displayed in the sheet information input dialog box by means of said display control unit; and a printing information setting unit configured to set both the logic sheet information and the print attribute information as the plural pieces of information required for printing when the available setting has been selected.

2. A printing control apparatus in accordance with claim 1, wherein the selection unit is configured to cause the plural pieces of logic sheet information to be displayed with index information, where the index information comprises sheet type information representing a type of a printing sheet set in said printing device.

3. A printing control apparatus in accordance with claim 1, wherein the selection unit is configured to cause the plural pieces of logic sheet information to be displayed with index information and causes a specific window to be displayed on said display device, said specific window comprising the plural pieces of logic sheet information arrayed in rows and the index information with respect to the print attribute information added to a specific row of the logic sheet information, for which the print attribute information has been set by said attribute information setting unit.

4. A printing control apparatus in accordance with claim 1, further comprising:

a data generation unit that generates the print data for said printing device; and a notification unit that informs said data generation unit of the contents set by said attribute information setting unit.

5. A printing control apparatus in accordance with claim 1, wherein said attribute information setting unit comprises a unit that sets a magnification-reduction ratio, which is calculated from a size of a printing sheet actually set in said printing device and the logic sheet information, as the print attribute information.

6. A printing control apparatus in accordance with claim 1, wherein said attribute information setting unit comprises a unit that sets a number of pages to be laid out in one printing plane of a printing sheet set in said printing device and a sequence of layout arrangement, as the print attribute information.

7. A printing control apparatus in accordance with claim 1, wherein said attribute information setting unit comprises a unit that sets an orientation of a printing image by said printing device, which includes a rotation by 180 degrees, as the print attribute information.

8. A printing control apparatus in accordance with claim 1, wherein said attribute information setting unit comprises a unit that sets a watermark printed on a printing sheet set in said printing device as well as a specification of the watermark, that is, a printing position, a size, a color, and a density of the watermark, as the print attribute information.

9. A printing control apparatus in accordance with claim 1, further comprising:

a print form display control unit that causes a print form image to be displayed on a display device, said print form image comprising the logic sheet information and the print attribute information mapped thereto.

10. A printing control apparatus that sets various pieces of information used for printing by a predetermined printing device based on input data from an input unit, which receives instructions given by a user, and causes said printing device to record print data according to the various pieces of information, said printing control apparatus comprising:

a printing sheet information storage unit configured to store plural pieces of printing sheet information that represent sizes of available printing sheets set in said printing device as a plurality of available settings of sheet information;

a display control unit configured to display the plurality of available settings stored in said available settings storage unit in a sheet information input dialog box;

an available settings addition unit configured to specify, based upon the input data from said input unit, print attribute information which represents an attribute with regard to printing of the print data and which is mapped to one of the plural pieces of printing sheet information stored in said available setting storage unit, and to add an item to be displayed by the display control unit, the item reflecting information including the specified print attribute information and the mapped printing sheet information as newly available settings displayed;

a selection unit configured to select based on the input data from said input unit one available setting among the plurality of available settings displayed in the sheet information input dialog box by means of said display control unit; and a printing information setting unit configured to set both the printing sheet information and the print attribute information as the plural pieces of information required for printing when the available setting has been selected.

11. A printing control apparatus in accordance with claim 10, wherein said selection unit comprises:

a display control unit that causes the plural pieces of printing sheet information to be displayed with index information, which is an index of the print attribute information set by said attribute information setting unit, on a display device; and a selecting unit that selects one piece of printing sheet information among the plural pieces of printing sheet information displayed by said display control unit, based on input data from said input device.

12. A printing control method that sets various pieces of information used for printing by a predetermined printing device based on input data from an input unit, which receives instructions given by a user, and causes said printing device to record print data according to the various pieces of information, said printing control method comprising the steps of:
- (a) storing plural pieces of logic sheet information that represent possible sheet sizes of the print data as a plurality of available settings of sheet information;
- (b) displaying the plurality of available settings in a sheet information input dialog box;
- (c) specifying, based on the input data, print attribute information which represents an attribute with regard to printing of the print data and which is mapped to one of the plural pieces of logic sheet information, and adding an item to be displayed by the display control unit, the item reflecting information including the specified print attribute information and the mapped logic sheet information as newly available settings to be displayed;
- (d) selecting based on the input data one available setting among the plurality of available settings displayed in the sheet information input dialog box; and
- (e) setting both the logic sheet information and the print attribute information as the plural pieces of information required for printing when the available setting has been selected.

13. A printing control method that sets various pieces of information used for printing by a predetermined printing device based on input data from an input unit, which receives instructions given by a user, and causes said printing device to record print data according to the various pieces of information, said printing control method comprising the steps of:
- (a) providing plural pieces of printing sheet information that represent sizes of available printing sheets set in said printing device as a plurality of available settings of sheet information;
- (b) displaying the plurality of available settings in a sheet information input dialog box;
- (c) specifying, based on the input data, print attribute information which represents an attribute with regard to printing of the print data and which is mapped to one of the plural pieces of printing sheet information, and adding an item to be displayed by the display control unit, the item reflecting information including the specified print attribute information and the mapped printing sheet information as newly available settings to be displayed;
- (d) selecting based on the input data from said input unit one available setting among the plurality of available settings displayed in the sheet information input dialog box; and
- (e) setting both the printing sheet information and the print attribute information as the plural pieces of information required for printing when the available setting has been selected.

14. A computer program product for setting various pieces of information used for printing by a predetermined printing device based on input data from an input unit, which receives instructions given by a user, and causing said printing device to record print data according to the various pieces of information, said computer program product comprising:
- a computer readable medium; and
- a computer program stored on the computer readable medium, the computer program comprising:
  - a first program configured to cause the computer to store plural pieces of logic sheet information that represent possible sheet sizes of the print data as a plurality of available settings of sheet information;
  - a second program configured to cause the computer to display the plurality of available settings in a sheet information input dialog box;
  - a third program configured to cause the computer to specify, based on the input data, print attribute information which represents an attribute with regard to printing of the print data and which is mapped to one of the plural pieces of logic sheet information, and to add an item to be displayed by the display control unit, the item reflecting information including the specified print attribute information and the mapped logic sheet information as newly available settings to be displayed;
  - a fourth program configured to cause a computer to select based on the input data one available setting among the plurality of available settings displayed in the sheet information input dialog box; and
  - a fifth program configured to cause a computer to set both the logic sheet information and the print attribute information as the plural pieces of information required for printing when the available setting has been selected.

15. A computer program product for setting various pieces of information used for printing by a predetermined printing device based on input data from an input unit, which receives instructions given by a user, and causing said printing device to record print data according to the various pieces of information, said computer program product comprising:
- a computer readable medium; and
- a computer program stored on the computer readable medium, the computer program comprising:
  - a first program for causing a computer to provide plural pieces of printing sheet information that represent sizes of available printing sheets set in said printing device as a plurality of available settings of sheet information;
  - a second program for causing a computer to display the plurality of available settings in a sheet information input dialog box;
  - a third program for causing a computer to specify, based on the input data, print attribute information which represents an attribute with regard to printing of the print data and which is mapped to one of the plural pieces of printing sheet information, and to add an item to be displayed by the display control unit, the item reflecting information including the specified print attribute information and the mapped printing sheet information as newly available settings to be displayed;
  - a fourth program for causing a computer to select based on the input data from said input unit one available setting among the plurality of available settings displayed in the sheet information input dialog box; and
  - a fifth program for causing a computer to set both the printing sheet information and the print attribute information as the plural pieces of information required for printing when the available setting has been selected.

* * * * *